United States Patent
Venkatasubramanian et al.

(10) Patent No.: US 12,228,997 B2
(45) Date of Patent: *Feb. 18, 2025

(54) FLEXIBLE AND OPTIMIZED POWER MANAGEMENT UNIT (PMU) FOR MULTIPLE POWER SUPPLY SCENARIOS

(71) Applicant: Cypress Semiconductor Corporation, San Jose, CA (US)

(72) Inventors: Radhika Venkatasubramanian, Austin, TX (US); Stephen W. Dow, Austin, TX (US); Prasad Rao Kotra, Bangalore (IN); Victor Simileysky, San Jose, CA (US); Ataur Rehman Khan, Saratoga, CA (US); David Moeller, Austin, TX (US); Brian Ballweber, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,022

(22) Filed: Oct. 11, 2023

(65) Prior Publication Data

US 2024/0111356 A1   Apr. 4, 2024

Related U.S. Application Data

(63) Continuation of application No. 17/689,711, filed on Mar. 8, 2022, now Pat. No. 11,815,981.

(51) Int. Cl.
*G06F 1/3296* (2019.01)
*G06F 1/26* (2006.01)
*G06F 1/28* (2006.01)
*G06F 1/30* (2006.01)

(52) U.S. Cl.
CPC ............ *G06F 1/3296* (2013.01); *G06F 1/263* (2013.01); *G06F 1/28* (2013.01); *G06F 1/305* (2013.01)

(58) Field of Classification Search
CPC . G06F 1/263; G06F 1/28; G06F 1/305; G06F 1/3296
See application file for complete search history.

(56) References Cited

U.S. PATENT DOCUMENTS

| | | | |
|---|---|---|---|
| 6,721,893 B1* | 4/2004 | Tressler | H02M 1/32 713/340 |
| 11,815,981 B2* | 11/2023 | Venkatasubramanian | G06F 1/26 |
| 2011/0179299 A1* | 7/2011 | Piwonka | G06F 1/3287 713/323 |
| 2017/0185094 A1* | 6/2017 | Atkinson | G06F 1/3243 |

* cited by examiner

Primary Examiner — Mark A Connolly

(57) ABSTRACT

Apparatuses and methods of operating a flexible and optimized power management unit (PMU) for multiple power supply scenarios are described. One integrated circuit includes a first terminal to couple to an unregulated power supply, a second terminal to couple to a regulated power supply, a first regulator, and a second regulator. The first regulator outputs a first supply voltage in a first configuration, and the second regulator outputs a second supply voltage in a second configuration. The first and second regulators do not operate concurrently.

19 Claims, 9 Drawing Sheets

FLEXIBLE AND OPTIMIZED POWER MANAGEMENT UNIT (PMU) FOR MULTIPLE POWER SUPPLY SCENARIOS

CROSS-REFERENCE TO RELATED APPLICATION

This application is a Continuation of U.S. patent application Ser. No. 17/689,711, filed on Mar. 8, 2022.

TECHNICAL FIELD

The present disclosure generally relates to power management of processing devices, particularly providing flexible and optimized power management for multiple power supply scenarios.

BACKGROUND

Different processing devices can have different power supply scenarios. For example, one microcontroller (also referred to as microcontroller unit (MCU)) or a System on Chip (SoC) can be used in an application board with an unregulated high voltage supply, such as a battery that operates between 2.7-5.5 volts, whereas another microcontroller can be used in another application board with a regulated low voltage supply (e.g., 1.8 volts+/−5%). Given these different power supply scenarios, two separate power management subsystems are needed to work with either of these power supply scenarios at a board-design level. No single-die solution provides the flexibility of choosing the power management subsystem that would work for either of these different scenarios at a board-design level.

DETAILED DESCRIPTION

As described above, there is no single-die solution that provides the flexibility of choosing a power management subsystem that works for different power supply scenarios, such as for a first scenario where an application board has an unregulated power supply and a second scenario where an application board has a regulated power supply. The different power supply scenarios can exist because different products or applications can have different power supply requirements or availability.

Different customized packages are designed to target the different power supply scenarios specifically. This causes an increase in inventory and packaging costs. This also adds to the cost of designing multiple power management subsystems for these different power supply scenarios.

Aspects of the present disclosure of embodiments overcome the deficiencies described above and others by providing a flexible and optimized power management unit (PMU) for different power supply scenarios. Aspects of the present disclosure can provide a flexible on-chip PMU that can be used in both high-voltage applications (e.g., battery and other unregulated power sources) and regulated voltage applications (e.g., 1.8 volts+/−5%) in a single-die solution. The flexible on-chip PMU can use board design configurations to choose an appropriate high-efficiency regulator (e.g., buck regulator) to provide an internal power supply for a processing device (e.g., MCU or SoC applications) in the single-die solution. Significant packaging and inventory cost savings can be achieved by providing a single-die solution. Aspects of the present disclosure allow product or application developers or designers to pick a method of supplying power to the processing device instead of being limited to one particular method of supplying power. Aspects of the present disclosure allow product or application developers or designers to choose whether to supply power to the processing device (e.g., SoC) directly from terminals of an unregulated power supply (e.g., a rechargeable Lithium-ion battery), having a voltage range between approximately 2.7 volts and approximately 5.5 volts, or from an externally regulated power supply (e.g., a 1.8 or 3.3 volts supply). In some cases where the processing device is supplied from an externally regulated power supply, the processing device can operate solely from that one power supply. It should be noted that the voltages described herein are merely exemplary and not intended to be limiting. For example, in some embodiments, the unregulated power supply can be a battery in an automotive application and have a voltage of 12 volts.

Aspects of the present disclosure of embodiments can be utilized in a variety of devices (e.g., smart speakers, laptops, tablets, mobile phones, toys, appliances, and the like) by providing flexible power management with a single-die solution that works in different configurations for different power supply scenarios.

Figure 1A:
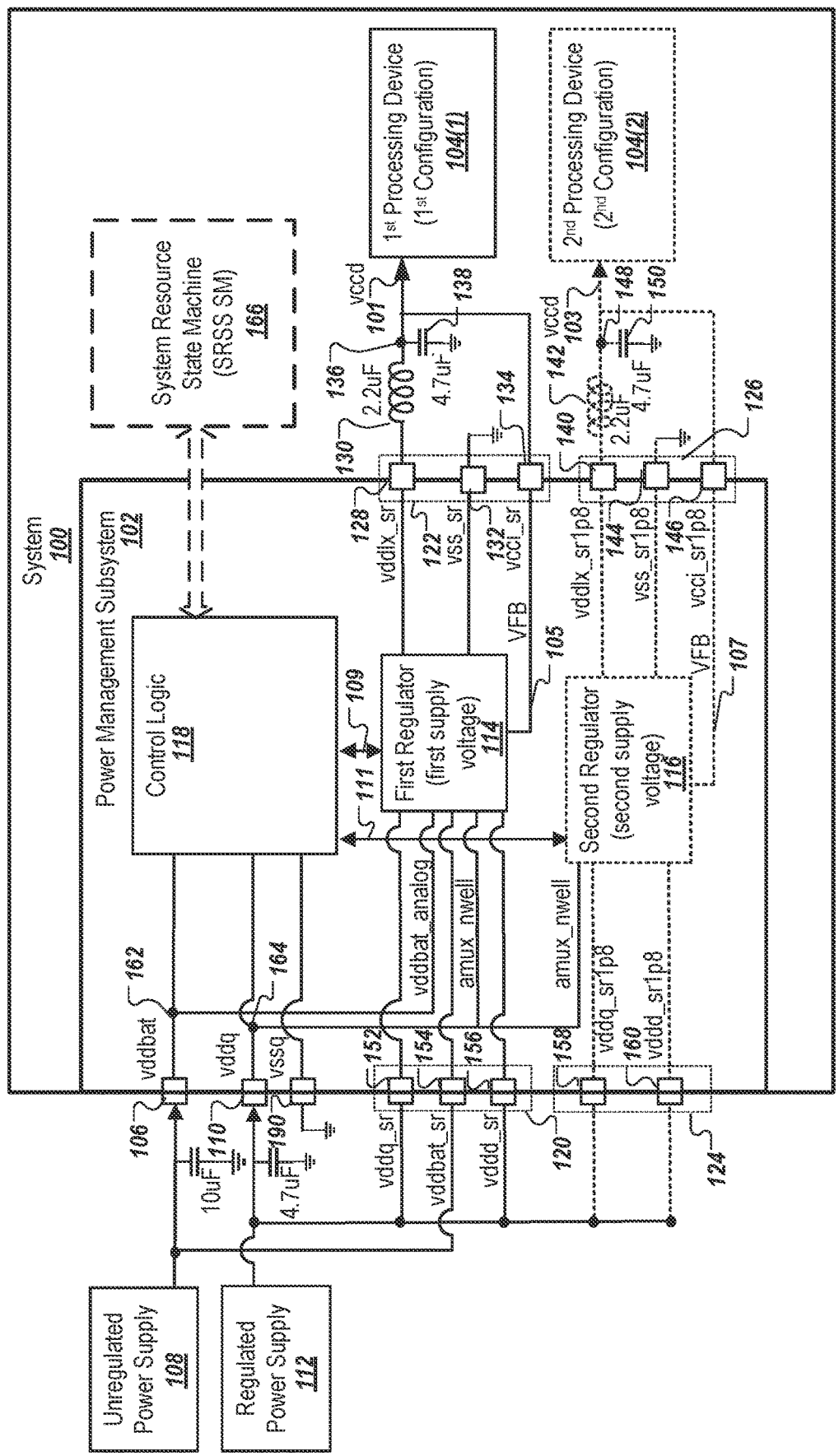
FIG. 1A is a block diagram of a system with a power management subsystem for supplying a first supply voltage to a processing device according to at least one embodiment.

FIG. 1A is a block diagram of a system 100 with a power management subsystem 102 for supplying a first supply voltage to a processing device 104 according to at least one embodiment. The power management subsystem 102 can be integrated with the processing device 104 in a single die. It should be noted that the power management subsystem 102 can be integrated with the processing device 104 in different power supply scenarios, referred to as a first configuration, a second configuration, and so forth. As illustrated in FIG. 1A, the processing device 104 is either in a first power supply scenario in which the power management system 102 is in a first configuration (labeled 104(1)) or in a second power supply scenario in which the power management system 102 is in a second configuration (labeled 104(2)). In one embodiment, the power management subsystem 102 is an integrated circuit (also referred to as power management subsystem IC 102) that is coupled to the processing device 104, and both the power management subsystem 102 and the processing device 104 are implemented on the same circuit board or different circuit boards. In another embodiment, the power management subsystem 102 is integrated into a single die with the processing device 104. In another embodiment, the power management subsystem 102 and processing device 104 can be implemented on two dies and one package. In at least one embodiment, the power management subsystem 102 is a separate die that is packaged with the processing device 104 into a single package. In at least one embodiment, the power management subsystem 102 is a power management unit (PMU). Alternatively, the power management subsystem 102 and the processing device 104 can be implemented in other configurations.

In the illustrated embodiment, the power management subsystem 102 includes a first terminal 106 to couple to an unregulated power supply 108 and a second terminal 110 to couple to a regulated power supply 112. In at least one embodiment, the unregulated power supply 108 includes a battery, such as a rechargeable Lithium-ion battery. In at least one embodiment, the battery operates at approximately 2.7 volts to approximately 5.5 volts. Alternatively, the unregulated power supply 108 can be other types of unregulated power supplies, including batteries with different voltage profiles.

In the illustrated embodiment, the power management subsystem 102 includes a first regulator 114 and a second regulator 116. In at least one embodiment, the first regulator 114 is coupled to the first terminal 106 and the second terminal 110. In at least one embodiment, the voltages supplied by regulated power supply 112 can also be internally generated to make the first regulator 114 operate exclusively from the unregulated power supply 108. The second regulator 116 is coupled to the second terminal 110. The first regulator 114 generates and outputs a first supply voltage 101 (vccd), and the second regulator 116 generates and outputs a second supply voltage 103 (vccd). In at least one embodiment, the first supply voltage 101 and second supply voltage 103 are the same (e.g., same voltage levels). In at least one embodiment, the first supply voltage 101 and second supply voltage 103 are different (e.g., different voltage levels). The power management subsystem 102 includes control logic 118 coupled to the first regulator 114 and the second regulator 116. The control logic 118 can control the first regulator 114 to output the first supply voltage 101 in a first configuration of the power management subsystem 102 and the second regulator 116 to output the second supply voltage 103 in a second configuration of the power management subsystem 102.

It should be noted that the first regulator 114 and the second regulator 116 do not operate concurrently. That is, when the first regulator 114 is configured to output the first supply voltage 101 to the processing device 104(1) in the first configuration, the second regulator 116 does not output the second supply voltage 103. In some cases, the terminal corresponding to the second supply voltage 103 is grounded in the first configuration. Similarly, when the second regulator 116 is configured to output the second supply voltage 103 to the processing device 104(2) in the second configuration, the first regulator 114 does not output the first supply voltage 101. In some cases, the terminal corresponding to the first supply voltage 101 is grounded in the second configuration. For example, the power management subsystem 102 can be implemented in a first power supply scenario for the processing device 104(1) in which there is both the unregulated power supply 108 and the regulated power supply 112 or use only the unregulated power supply 108 and generate the regulated power supply 112 internally. In another embodiment, the power management subsystem 102 can be implemented in a second power supply scenario for the processing device 104(2), in which there is only the regulated power supply 112. In another embodiment, the power management subsystem 102 can be implemented in a third power supply scenario for the processing device 104(1), in which there is only the unregulated power supply 108. In another embodiment, the power management subsystem 102 can be implemented in a fourth power supply scenario for the processing device 104(2) in which there is both the unregulated power supply 108 and the regulated power supply 112.

In the illustrated embodiment, the power management subsystem 102 includes a first set of input terminals 120 and a first set of output terminals 122 coupled to the first regulator 114 and a second set of input terminals 124 and a second set of output terminals 126 coupled to the second regulator 116. It should be noted that output terminals can provide an output signal or receive an input signal based on the configuration. For example, the output terminals can include feedback terminals or be grounded. In these cases, the signals can be inputs despite being referred to as output terminals. In a first configuration, the first set of input terminals 120 and the first set of output terminals 122 are active terminals coupled to receive and output signals or voltage potentials. The second set of input terminals 124 and the second set of output terminals 126 are grounded. In a second configuration, the first set of input terminals 120 and the first set of output terminals 122 are grounded, and the second set of input terminals 124 and the second set of output terminals 126 are coupled to receive and output signals or voltage potentials.

In the illustrated embodiment, the first set of output terminals 122 includes a first output terminal 128 coupled to the first regulator 114 and the processing device 104(1) in the first configuration. The first output terminal 128 is coupled to a first side of an external inductor 130 in the first configuration. The first output terminal 128 is coupled to ground in the second configuration. The first set of output terminals 122 includes a second output terminal 132 coupled to the first regulator 114. Although referred to as a second output terminal 132, the second output terminal 132 can be considered a ground terminal when grounded as illustrated in FIG. 1A. The second output terminal 132 is coupled to ground in the first and second configurations. The first set of output terminals 122 can include a third output terminal 134 coupled to the first regulator 114. Although referred to as a third output terminal 134, the third output terminal 134 can be considered a feedback terminal (or an input terminal) when coupled to receive a feedback signal as illustrated in FIG. 1A. In the first configuration, the third output terminal 134 is coupled to a node 136 associated with the first supply voltage 101. The node 136 is coupled to a second side of the external inductor 130 in the first configuration. An external capacitor 138 is coupled between the node 136 and ground in the first configuration in at least one embodiment. The third output terminal 134 is coupled to ground in the second configuration. The first regulator 114 is configured to receive a first voltage feedback signal 105 via the third output terminal 134.

In the illustrated embodiment, the second set of output terminals 126 includes a first output terminal 140 coupled to the second regulator 116 and the processing device 104(2) in the second configuration. The first output terminal 140 is coupled to a first side of an external inductor 142 in the second configuration. The first output terminal 140 is coupled to ground in the first configuration. The second set of output terminals 126 includes a second output terminal 144 coupled to the second regulator 116. Although referred to as a second output terminal 144, the second output terminal 144 can be considered a ground terminal when grounded as illustrated in FIG. 1A. The second output terminal 144 is coupled to ground in the first and second configurations. The second set of output terminals 126 can include a third output terminal 146 coupled to the second regulator 116. Although referred to as a third output terminal 146, the third output terminal 146 can be considered a feedback terminal (or an input terminal) when coupled to receive a feedback signal as illustrated in FIG. 1A. In the second configuration, the third output terminal 146 is coupled to a node 148 associated with the second supply voltage 103 in the second configuration. The node 148 is coupled to a second side of the external inductor 142 in the second configuration. In at least one embodiment, an external capacitor 150 is coupled between the node 148 and ground in the second configuration. The third output terminal 146 is coupled to ground in the first configuration. The second regulator 116 can receive a second voltage feedback signal 107 via the third output terminal 146.

In the illustrated embodiment, the first set of input terminals 120 includes a first input terminal 152 coupled to the first regulator 114. In the first configuration, the first input terminal 152 is coupled to the regulated power supply 112 and is coupled to ground in the second configuration. The first set of input terminals 120 includes a second input terminal 154 coupled to the first regulator 114. In the first configuration, the second input terminal 154 is coupled to the unregulated power supply 108. The second input terminal 154 is coupled to ground in the second configuration. The first set of input terminals 120 includes a third input terminal 156 coupled to the first regulator 114. In the first configuration, the third input terminal 156 is coupled to the regulated power supply 112. The third input terminal 156 is coupled to ground in the second configuration.

In the illustrated embodiment, the second set of input terminals 124 includes a first input terminal 158 coupled to the second regulator 116. In the second configuration, the first input terminal 158 is coupled to the regulated power supply 112. The first input terminal 158 is coupled to ground in the first configuration. The second set of input terminals 124 includes a second input terminal 160 coupled to the second regulator 116. In the second configuration, the second input terminal 160 is coupled to the regulated power supply 112. The second input terminal 160 is coupled to ground in the first configuration.

In the illustrated embodiment, the first regulator 114 is coupled to the first set of input terminals 120, a first internal node 162 (vddbat_analog) coupled to the first terminal 106, and a second internal node 164 (amux_nwell) that is coupled to the second terminal 110. In the illustrated embodiment, the second regulator 116 is coupled to the second set of input terminals 124, and the second internal node 164 (amux_nwell).

In at least one embodiment, the first regulator 114 is to output the first supply voltage 101 in response to a second set of terminals (124, 126) being grounded, and the second regulator 116 is to output the second supply voltage 103 in response to a first set of terminals (120, 122) being grounded.

In at least one embodiment, the power management subsystem 102 is coupled to a system resource subsystem state machine 166 (SRSS SM). The SRSS SM 166 can provide one or more control signals to the control logic 118. The control logic 118 can control the first regulator 114 using a first set of control signals 109 and the second regulator 116 using a second set of control signals 111. Alternatively, the control logic 118 can control the first regulator 114 and the second regulator 116 using a common set of control signals.

Figure 1B:
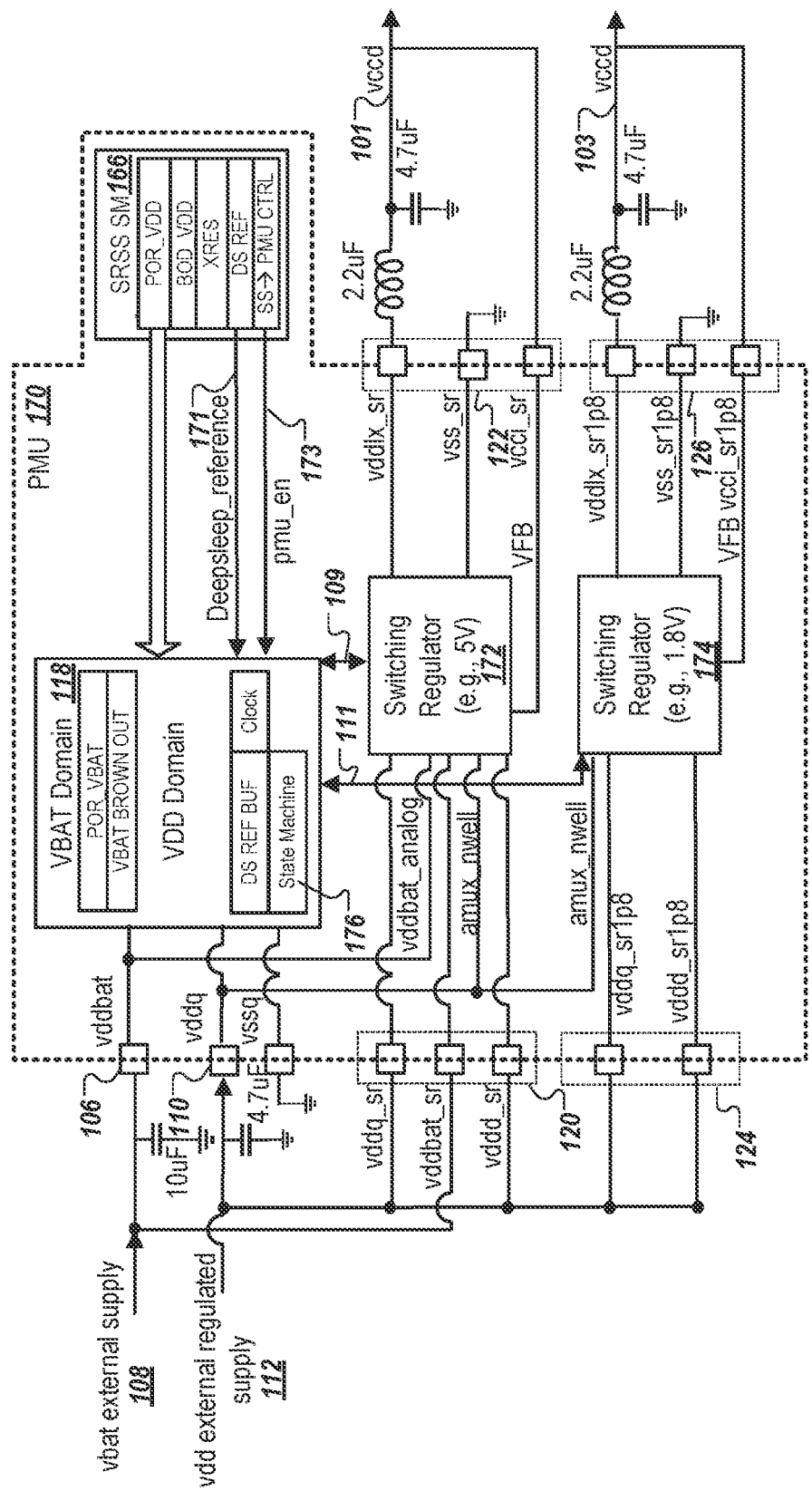
FIG. 1B is a block diagram of a multi-regulator power management unit (PMU) according to at least one embodiment.

In at least one embodiment, the first regulator 114 is a switching regulator, such as a 5V switching regulator, and the second regulator 116 is a switching regulator, such as a 1.8V switching regulator, such as illustrated in FIG. 1B. In another embodiment, other types of switching regulators can be used for the first regulator 114 and the second regulator 116. In at least one embodiment, the first regulator 114 is a first buck converter, such as a 5V buck converter, and the second regulator 116 is a second buck converter, such as a 1.8V buck converter. In at least one embodiment, the second supply voltage is in a voltage range between approximately 1.8V and approximately 3.3V, and the first supply voltage is higher than the second supply voltage. The first buck converter can operate at a first voltage level, and the second buck converter can operate at a second voltage level less than the first voltage level. In another embodiment, the first regulator 114 is a first buck-boost converter and the second regulator 116 is a second buck-boost converter. Other types of regulators can be used in other embodiments, such as DC-DC power converters and linear regulators. The power management subsystem 102 can include more than two regulators (e.g., three regulators, four regulators, or the like) in other embodiments.

FIG. 1B is a block diagram of a multi-regulator power management unit (PMU) 170 according to at least one embodiment. The multi-regulator PMU 170 can be similar to the power management subsystem 102 described above, as noted by similar reference numbers. In this embodiment, the multi-regulator PMU 170 includes a first switching regulator 172 (e.g., 5V buck converter with 400 mA peak current), a second switching regulator 174 (e.g., 5V buck converter with 400 mA peak current), and the control logic 118. The multi-regulator PMU 170 includes similar input and output terminals as described above with respect to FIG. 1B as noted by similar reference numbers. The control logic 118 is configured to control the first switching regulator 172 to generate the first supply voltage 101 or control the second switching regulator 174 to generate the second supply voltage 103. The first switching regulator 172 and the second switching regulator 174 do not operate concurrently.

In the illustrated embodiment, the system resource state machine (SRSS SM) 166 can receive a power-on-reset (POR) signal (POR_VDD) from a POR circuit associated with regulated power supply 112 (or an internally generated equivalent in the first scenario), a brown-out-detection signal (BOD_VDD) from a BOD circuit associated with the regulated power supply 112 (or an internally generated equivalent in the first scenario), an external chip reset signal (XRES), a deep sleep reference signal (DS REF) reference signal, and a subsystem-to-PMU control signal. The SRSS SM 166 can provide a deep sleep reference signal 171 (deepsleep_reference), and an enable signal 173 (pmu_en) to the control logic 118.

In the illustrated embodiment, the control logic 118 includes logic for the different configurations. For example, the control logic 118 can include a battery domain (VBAT domain) and a regulated voltage domain (VDD) domain. In the battery domain, the control logic 118 can include a power-on-reset detection and brown-out-detection for the unregulated power supply 108. In the regulated voltage domain, the control logic 118 can include a deep sleep reference generator to store the deep sleep reference signal 171 and other reference signals and calibration settings. In at least one embodiment, the control logic 118 includes a PMU state machine 176 that controls operations of the first switching regulator 172 in the first configuration and the second switching regulator 174 in the second configuration. In at least one embodiment, the PMU state machine 176 is coupled to inputs of the first switching regulator 172 and inputs of the second switching regulator 174. The PMU state machine 176 provides one or more control to configure the first switching regulator 172 to operate in the first configuration or the second switching regulator 174 in the second configuration. In at least one embodiment, the PMU state machine 176 can receive feedback signals from the first switching regulator 172 in the first configuration or the second switching regulator 174 in the second configuration.

In other embodiments, the multi-regulator PMU 170 can include other regulators, such as linear regulators for other resources in the system.

In at least one embodiment, the first switching regulator 172 is a first buck converter that operates at a first voltage level and the second switching regulator 174 is a second buck converter that operates at a second voltage level. In at least one embodiment, the first voltage level is approximately 5 volts, and the second voltage level is 1.8 volts. Alternatively, other voltage levels can be obtained using other types of buck converters or other types of switching regulators. It should be noted that other supply voltages could be used in other embodiments.

Figure 2:
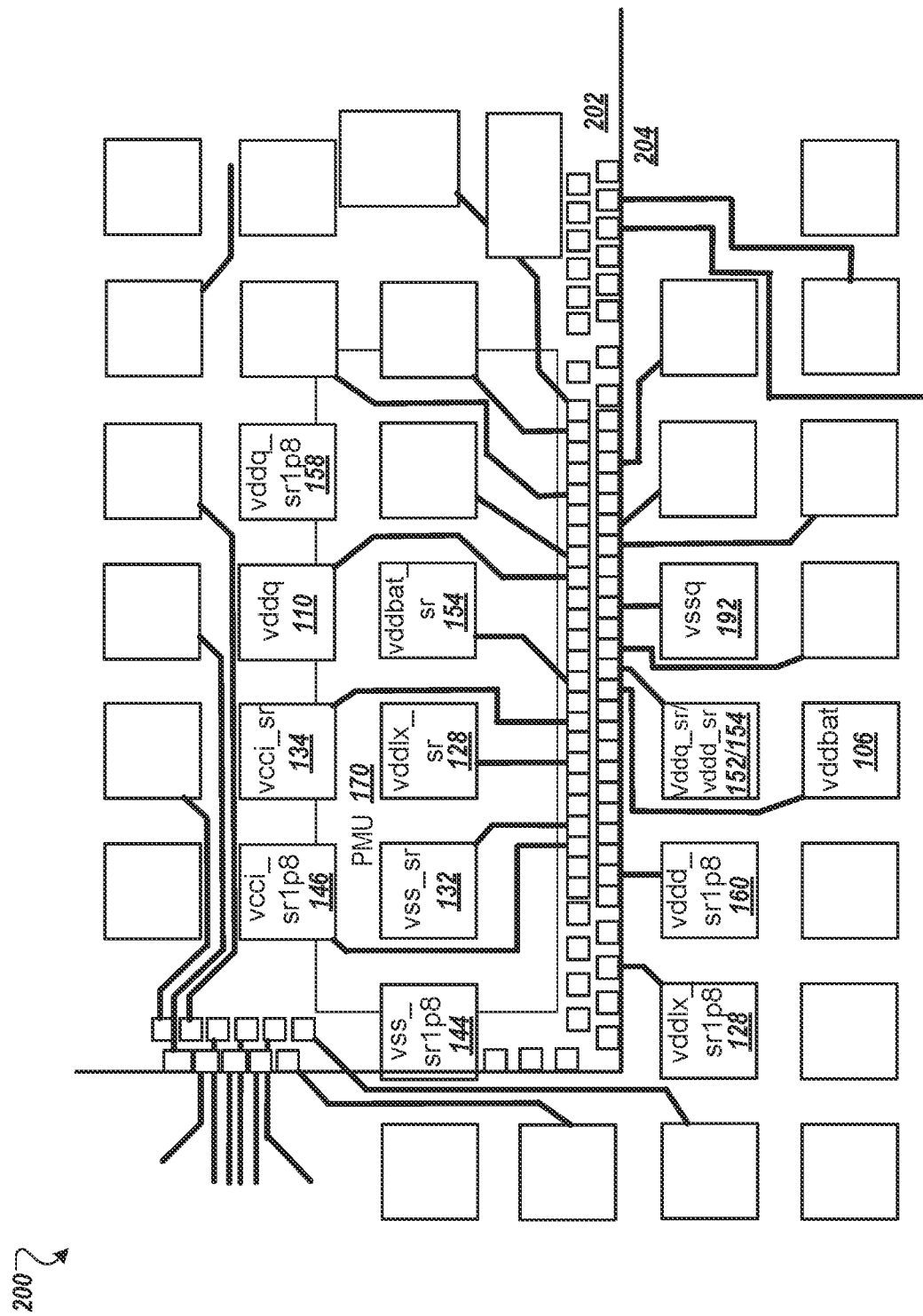
FIG. 2 is a layout diagram of terminals of an integrated circuit and terminals of a circuit board on which the integrated circuit is located according to at least one embodiment.

FIG. 2 is a layout diagram 200 of terminals of an integrated circuit 202 and terminals of a circuit board 204 on which the integrated circuit is located according to at least one embodiment. The integrated circuit 202 includes the multi-regulator PMU 170 and various terminals, such as some of the terminals described above with respect to FIGS. 1A-1B (e.g., 146, 134, 110, 158, 144, 132, 128, 154). The circuit board 204 includes various terminals, such as some of the terminals described above with respect to FIGS. 1A-1B (e.g., 128, 160, 152, 154, 192, 106). In other embodiments, other layouts of terminals can be used.

Figure 3:
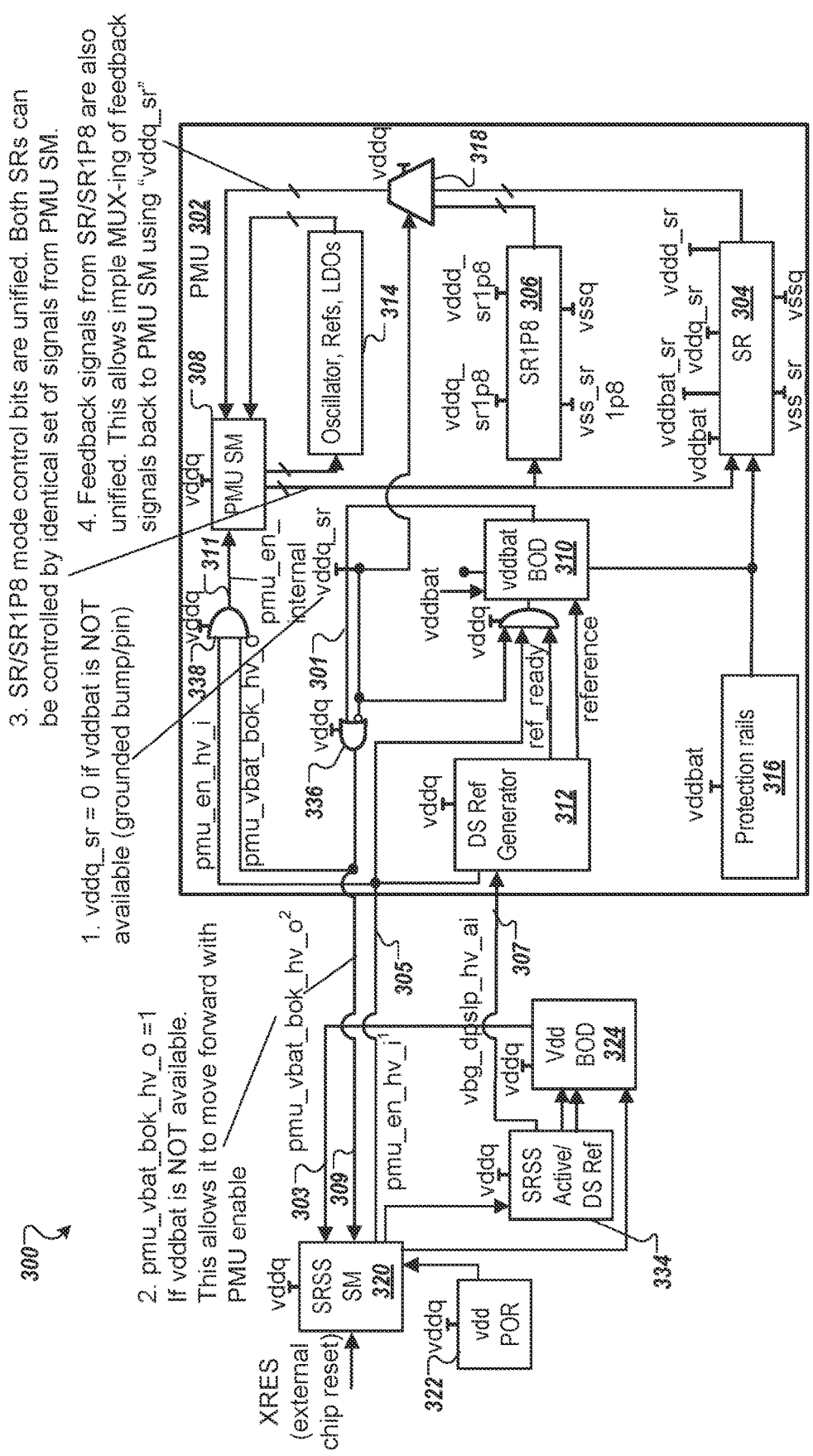
FIG. 3 is a circuit diagram of a multi-regulator PMU according to at least one embodiment.

FIG. 3 is a circuit diagram 300 of a multi-regulator PMU 302 according to at least one embodiment. The multi-regulator PMU 302 can be similar to the power management subsystem 102 of FIG. 1A or the multi-regulator PMU 170 of FIG. 1B. In this embodiment, the multi-regulator PMU 302 includes two switching regulators, including a first switching regulator 304 and a second switching regulator 306. The multi-regulator PMU 302 includes a PMU state machine 308, a battery brown-out-detection (BOD) circuit 310, and various logic gates to control operations of the first and second switching regulators 304, 306 depending on a first configuration (first power supply scenario) or a second configuration for a second power supply scenario. In other embodiments, the multi-regulator PMU 302 can include additional regulators for additional configurations for other power supply scenarios. The multi-regulator PMU 302 can also include other types of regulators for other system components.

In at least one embodiment, the multi-regulator PMU 302 includes a deep sleep reference generator 312 that can provide a reference signal and a reference ready signal to control the battery BOD circuit 310. The battery BOD circuit 310 is coupled to a first terminal, coupled to an unregulated power supply (vddbat). The battery BOD circuit 310 can output a fault signal 301 to an external circuit, such as system resource subsystem state machine 320 (SRSS SM) illustrated in FIG. 3. The SRSS SM 320 can receive a power-on-reset (POR) signal from a POR detection circuit 322. A regulated voltage BOD circuit 324 can detect a BOD condition on the regulated voltage supply (vdd) and provide a reset signal 303 to the SRSS SM 320. The regulated voltage BOD circuit 324 can receive an active reference and a deep sleep reference from a reference generator 334. When in the deep sleep mode, the reference generator 334 can provide a deep sleep reference signal 307 to the deep sleep reference generator 312 of the multi-regulator PMU 302.

The PMU state machine 308 can control other oscillators, reference circuits, and other linear regulators (block 314). The multi-regulator PMU 302 can include protection rails 316 to protect low-voltage gates when there is no regulated supply (1.8V vdd supply).

In at least one embodiment, the multi-regulator PMU 302 includes a multiplexer 318 (or other types of selection circuit) that can be controlled to provide feedback signals from either the first switching regulator 304 or the second switching regulator 306 depending on the multi-regulator PMU 302 operating in a first configuration or a second configuration. In at least one embodiment, the multiplexer 318 is coupled to an input of the PMU state machine 308, an output of the first switching regulator 304, and an output of the second switching regulator 306. The multiplexer 318 receives a first feedback signal from the first switching regulator 304 in the first configuration and a second feedback signal from the second switching regulator 306 in the second configuration. The multiplexer 318 provides the first feedback signal or the second feedback signal to the PMU state machine 308. The PMU state machine 308 can use separate control signals to the control the first switching regulator 304 and the second switching regulator 306. Alternatively, the PMU state machine 308 can use common control signals to control the first switching regulator 304 and the second switching regulator 306.

In at least one embodiment, if the unregulated power supply is unavailable (vddq_sr=0 (true), vddbat is not available), the corresponding terminals will be grounded (e.g., all input terminals 120 are grounded). This grounded signal (vddq_sr=0) is received by a first logic gate 336 (e.g., OR gate with an inverted input). As a result, the first logic gate 336 outputs a signal 309 (pmu_vbat_bok_o) to the SRSS SM 308 to allow the SRSS SM 320 to enable the PMU state machine 308. The signal 309 (pmu_vbat_bok_o) is high if the unregulated power supply is unavailable. The signal 309 (pmu_vbat_bok_o) is low if the fault signal 301 is detected by the battery BOD circuit 310. The PMU state machine 308 can be enabled using a second logic gate 338 (e.g., AND gate). The second logic gate 338 receives the signal 309 (pmu_vbat_bok_o), output to the SRSS SM 320, and an enable signal 305 (pmu_en_hv_i) generated by the SRSS SM 320. The enable signal 305 (pmu_en_hv_i) can be generated by the SRSS SM 320 after the regulated voltage BOD circuit 3324 is released (as indicated in reset signal 303). The second logic gate 338 provides a PMU enable signal 311 (pmu_en_internal) to the PMU SM 308 in response to the enable signal 305 being activated. It should be noted that the signal 309 (pmu_vbat_bok_o) is treated by the SRSS SM 320 as a fault signal instead of a reset signal. If the regulated voltage (vdd, e.g., 1.8V) is good, there is no unregulated voltage (no vddbat while vddq_sr=1.8V), the SRSS SM 320 waits indefinitely for the unregulated voltage (vddbat) to clear the BOD threshold.

In at least one embodiment, the PMU SM 308 uses unified mode control bits (or common control bits) to control the first switching regulator 304 and the second switching regulator 306. That is, the first switching regulator 304 and the second switching regulator 306 can be controlled by an identical set of signals from the PMU SM 308. The feedback signals from the first switching regulator 304 and the second switching regulator 306 can also be unified by the multiplexer 318. The multiplexer 318 can allow the feedback signals back to the PMU SM 308 using the unified signals (vddq_sr).

Figure 4:
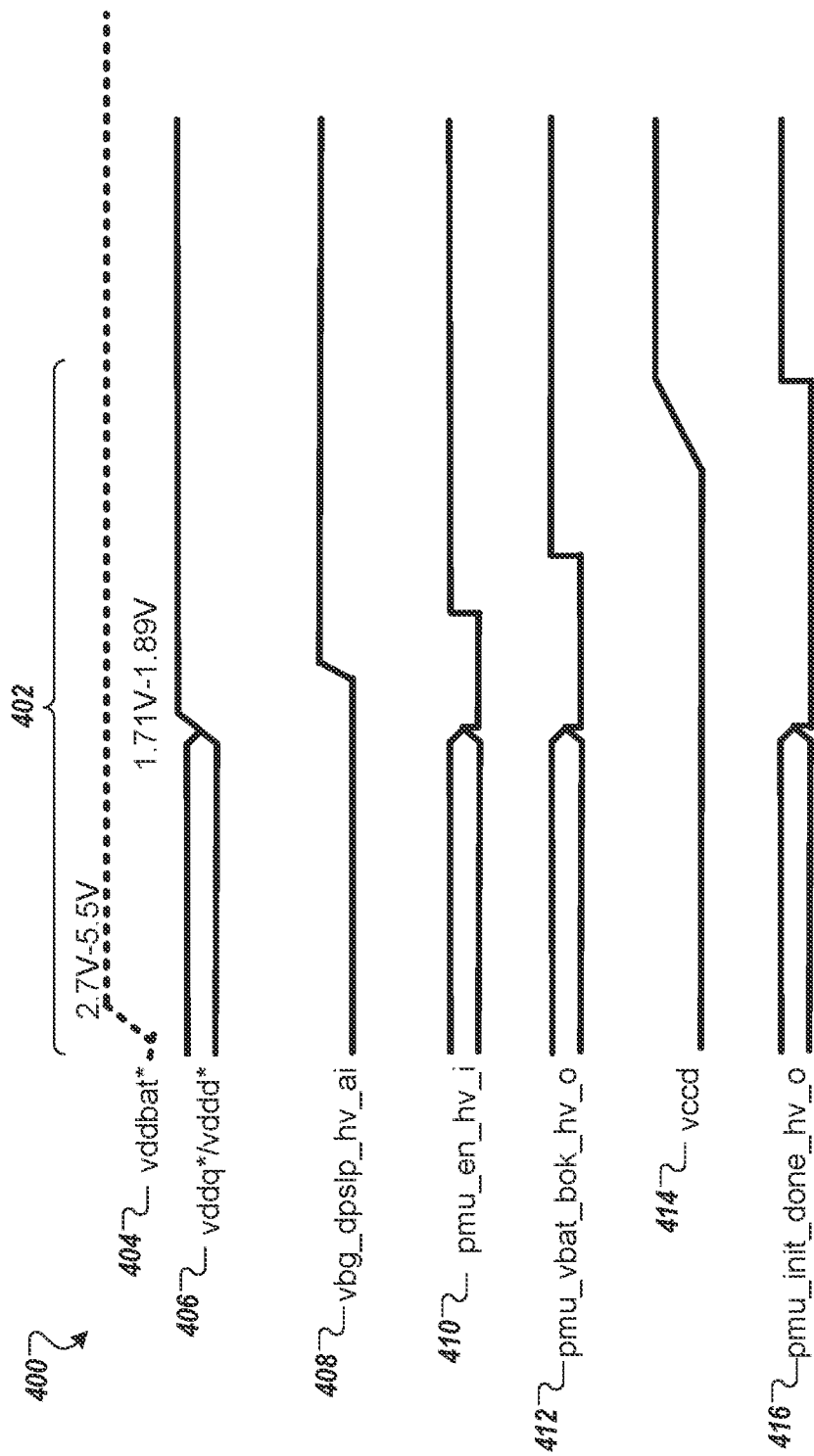
FIG. 4 is a timing diagram of signals of the multi-regulator PMU during a boot-up process according to at least one embodiment.

FIG. 4 is a timing diagram 400 of signals of the multi-regulator PMU during a boot-up process 402 according to at least one embodiment. During the boot-up process 402, a first terminal 404, coupled to an unregulated power supply, increases from a first voltage (e.g., 0V) to a second voltage (e.g., 2.7-5.5V). After some time, a second terminal 406, coupled to a regulated power supply, is set to a third voltage (e.g., 1.71-1.89V). After some time, a deep sleep reference signal 408 (e.g., 307) is set to a specified voltage level, an enable signal 410 (e.g., 305) is activated, and a signal 412 (e.g., 309 (pmu_vbat_bok_o)) is activated. As a result, a supply voltage 414 transitions from a first voltage (e.g., 0V) to a second voltage (e.g., 0.8V). Once the supply voltage 414 is transitioned, the boot-up process 402 is completed, as indicated by a completion signal 416 (e.g., pmu_int_done_hv_o). In this embodiment, the unregulated power supply is increased before the regulated power supply. The unregulated power supply can be delayed in other embodiments, such as illustrated in FIG. 5.

Figure 5:
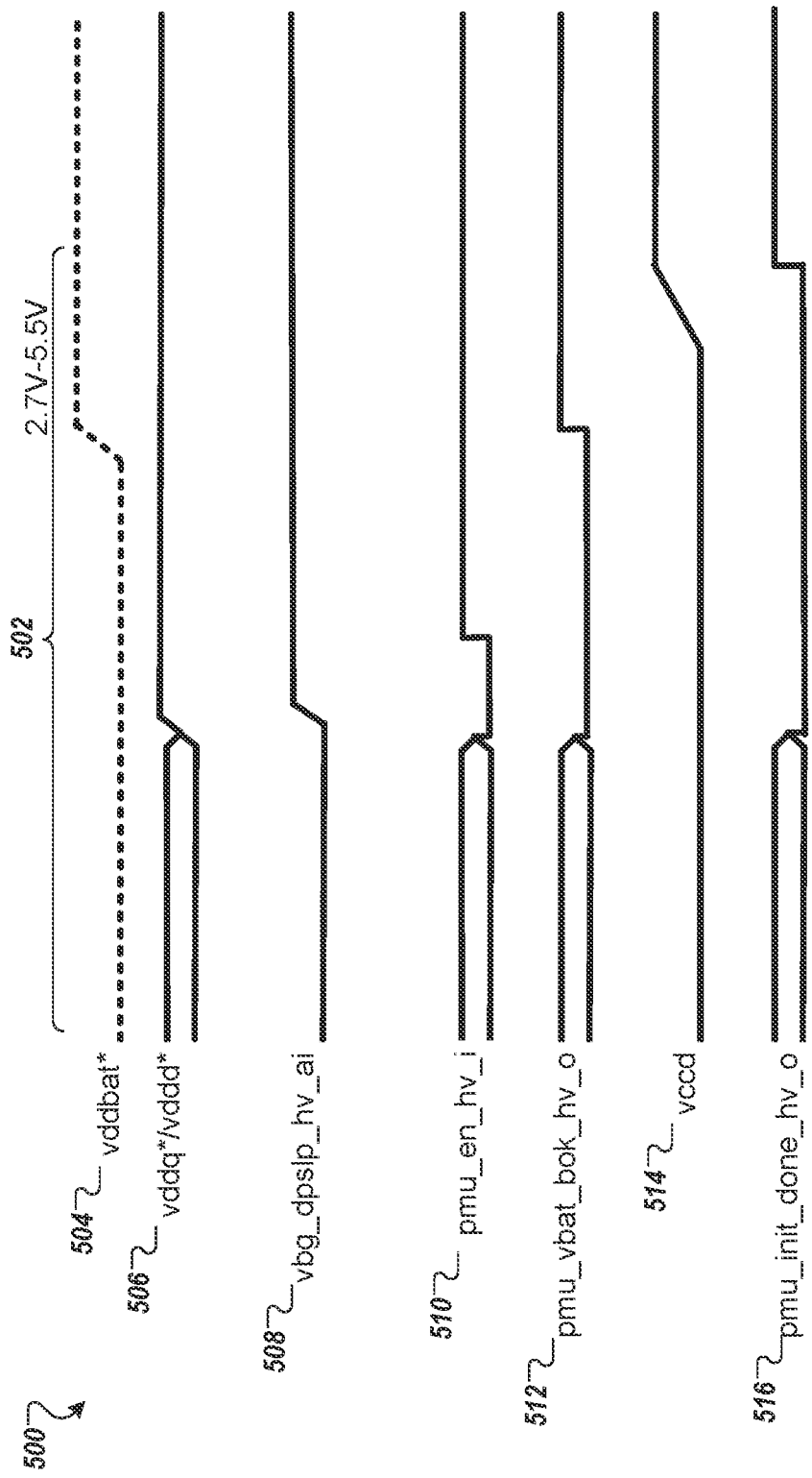
FIG. 5 is a timing diagram of signals of the multi-regulator PMU during a boot-up process with a delayed voltage from an unregulated power source according to at least one embodiment.

FIG. 5 is a timing diagram 500 of signals of the multi-regulator PMU during a boot-up process 502 with a delayed voltage from an unregulated power source according to at least one embodiment. During the boot-up process 502, a first terminal 504, coupled to an unregulated power supply, increases from a first voltage (e.g., 0V) to a second voltage (e.g., 2.7-5.5V) after a second terminal 506, coupled to a regulated power supply, is set to a third voltage (e.g., 1.71-1.89V). After some time, a deep sleep reference signal 508 (e.g., 307) is set to a specified voltage level, an enable signal 510 (e.g., 305) is activated, and a signal 512 (e.g., 309 (pmu_vbat_bok_o)) is activated. As a result, a supply voltage 514 transitions from a first voltage (e.g., 0V) to a second voltage (e.g., 0.8V). Once the supply voltage 514 is transitioned, the boot-up process 502 is completed, as indicated by a completion signal 516 (e.g., pmu_int_done_hv_o).

Figure 6:
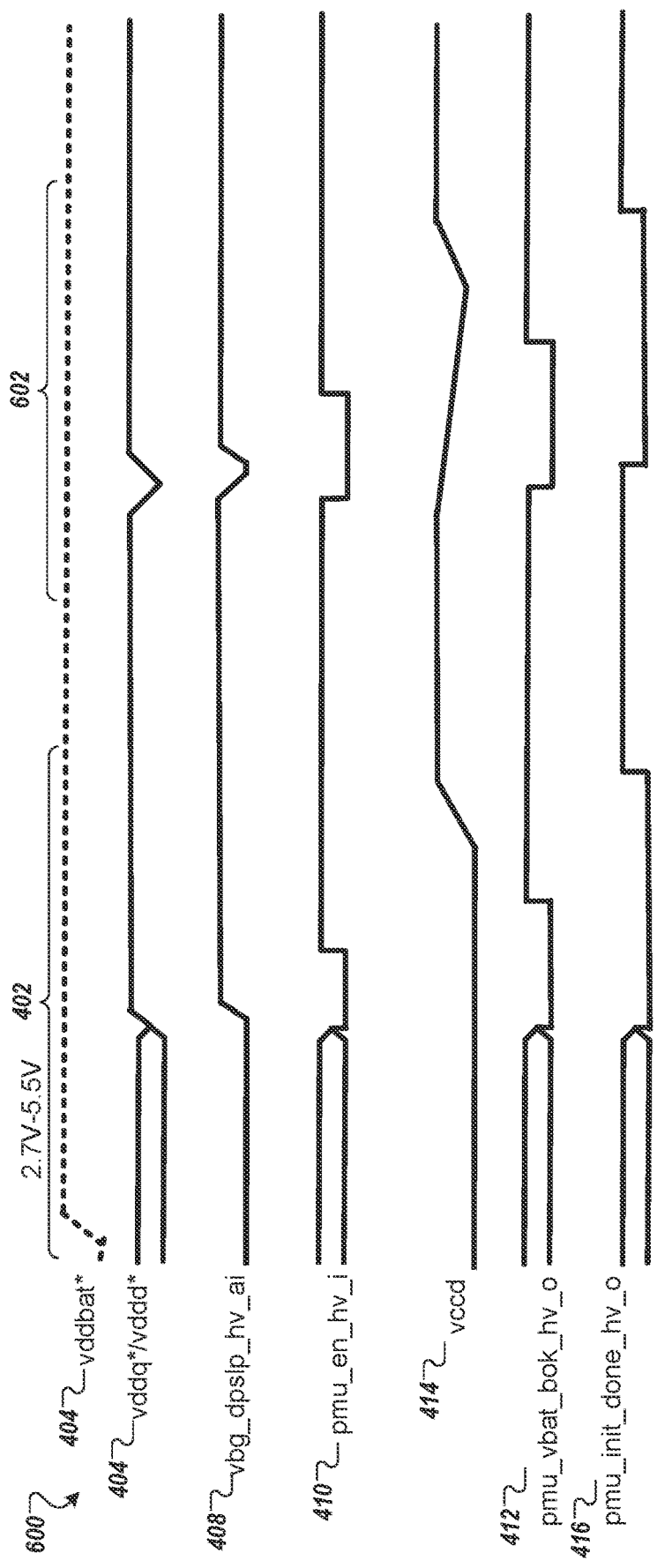
FIG. 6 is a timing diagram of signals of the multi-regulator PMU during a brown-out-detection event of a regulated power source according to at least one embodiment.

FIG. 6 is a timing diagram 600 of signals of the multi-regulator PMU during a BOD event 602 of a regulated power source according to at least one embodiment. In this embodiment, the regulated power supply, coupled to the second terminal 406, drops below a BOD threshold in the BOD event 602 after the boot-up process 402. During the BOD event, the first terminal 404, coupled to the unregulated power supply, remains at the third voltage, and the deep sleep reference 408 is reset and transitions back to the specified voltage level. The enable signal 410 is reset and transitions back to being activated after some time. The signal 412 is also reset and transitions back to being activated after some time. As a result of the BOD event 602, the supply voltage 414 decreases until the signal 412 is activated. As a result, the supply voltage is transitioned from that particular voltage to the second voltage (e.g., 0.8V). Once the supply voltage 414 is transitioned back to the second voltage, the BOD event 602 is complete, as indicated by a completion signal 416 (e.g., pmu_int_done_hv_o).

Figure 7:
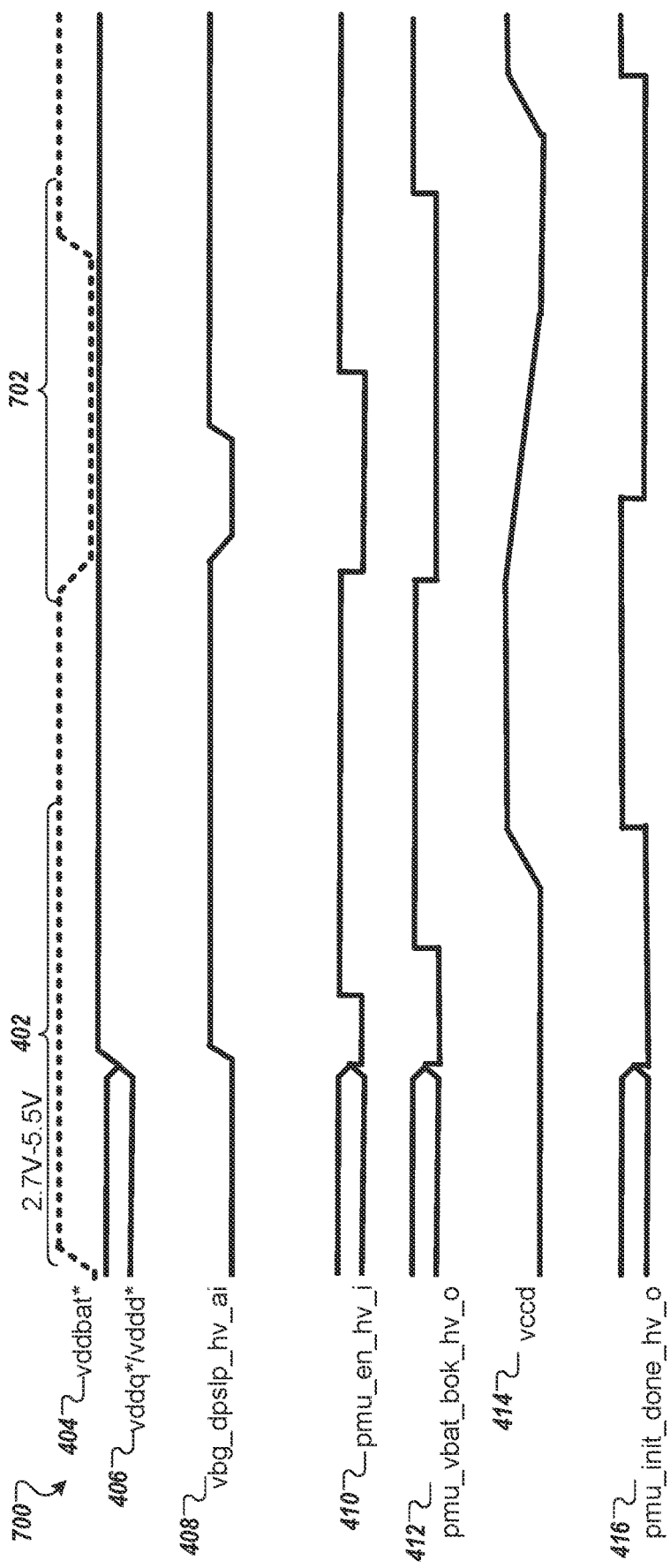
FIG. 7 is a timing diagram of signals of the multi-regulator PMU during a brown-out-detection event of an unregulated power source according to at least one embodiment.

FIG. 7 is a timing diagram 700 of signals of the multi-regulator PMU during a BOD event 702 of an unregulated power source according to at least one embodiment. In this embodiment, after the boot-up process 402, the unregulated power supply, coupled to the first terminal 404, drops below a BOD threshold in the BOD event 702. During the BOD event 702, the second terminal 406, coupled to the regulated power supply, remains at the second voltage, and the deep sleep reference signal 408 is reset and transitions back to the specified voltage level. The enable signal 410 is reset and transitions back to being activated after some time. The signal 412 is also reset and transitions back to being activated after some time. As a result of the BOD event 702, the supply voltage 414 decreases until the signal 412 is activated. As a result, the supply voltage is transitioned from that particular voltage to the second voltage (e.g., 0.8V). Once the supply voltage 414 is transitioned back to the second voltage, the BOD event 702 is complete, as indicated by a completion signal 416 (e.g., pmu_int_done_hv_o).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

As described herein, the multi-regulator PMU can provide a single-die solution that provides the flexibility of choosing the power management subsystem that would work with multiple power-supply requirements or multiple power-supply scenarios as described herein. The multi-regulator PMU can provide significant savings in packaging and inventory. The multi-regulator PMU can allow developers or designers to pick their preferred method of supplying power to a processing system (e.g., SoC, microcontroller, or the like). The developers or designers can choose whether to supply power to the processing system directly from the terminals of a rechargeable Lithium-ion battery (e.g., 2.7V to 5.5V) or for the processing system to operate from an externally regulated supply, such as 1.8V or 3.3V supply. In some cases where the processing system is supplied with the regulated voltage supply, the processing system can operate solely from that one supply.

Figure 8:
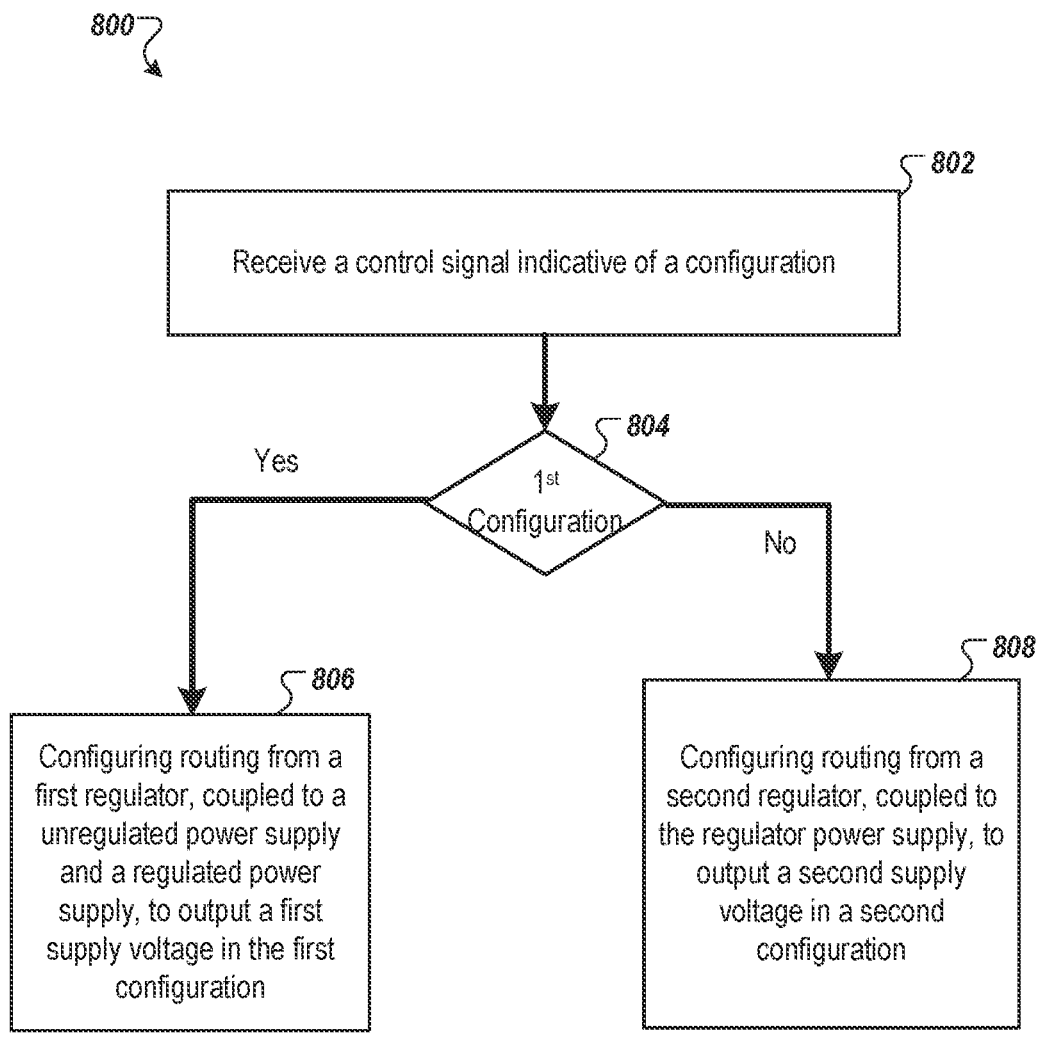
FIG. 8 is a flow diagram of a method of configuring routing of a first regulator and a second regulator in a first configuration and a second configuration, according to at least one embodiment.

FIG. 8 is a flow diagram of a method 800 of configuring routing of a first regulator and a second regulator in a first configuration and a second configuration, according to at least one embodiment. In some embodiments, processing logic may perform the method 800. The processing logic may include hardware, software, or any combination thereof. In at least one embodiment, the power management subsystem 102 performs the method 800. In another embodiment, the integrated circuit 202 performs the method 800. In another embodiment, multi-regulator PMU 302 performs the method 800. Alternatively, other systems, circuits, and components described herein can perform some or all of the operations of method 800.

Referring to FIG. 8, the processing logic begins the method 800 by receiving a control signal indicative of a configuration (block 802). The processing logic determines whether the configuration is a first configuration or a second configuration (block 802). The processing logic configures routing from a first regulator, coupled to an unregulated power supply and a regulated power supply, to output a first supply voltage in the first configuration (block 806). The processing logic configures routing from a second regulator, coupled to the regulated power supply, to output a second supply voltage in the second configuration (block 808). The first regulator and the second regulator do not operate concurrently. In at least one embodiment, the first and second supply voltages are the same. In at least one embodiment, the first and second supply voltages are different. It should be noted that the first and second supply voltages can supply vccd to a microcontroller.

In a further embodiment, the processing logic configures the routing to ground a first output terminal coupled to the second regulator in the first configuration and configures the routing to ground a second output terminal coupled to the first regulator in the second configuration.

In other embodiments, additional control signals can be used to control routing for coupling other terminals and components as described above.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "applying," "coupling," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:
1. An integrated circuit (IC) comprising:
a first regulator coupled to a first power supply via a first terminal and a second power supply via a second terminal, wherein the first regulator is for outputting a first supply voltage in a first configuration; and a second regulator coupled to the second power supply via the second terminal, wherein the second regulator is for outputting a second supply voltage in a second configuration, wherein the first regulator is coupled to a ground potential via a first set of terminals in the second configuration, and wherein the second regulator is coupled to the ground potential via a second set of terminals in the first configuration.

2. The IC of claim 1, wherein the first power supply is an unregulated power supply.

3. The IC of claim 2, wherein the unregulated power supply is a battery voltage.

4. The IC of claim 1, wherein the second power supply Is a regulated power supply.

5. The IC of claim 1, wherein the first set of terminals comprises:
a first output terminal coupled to the first regulator, wherein the first output terminal is coupled to a first side of an external inductor in the first configuration, wherein the first output terminal is coupled to the ground potential in the second configuration;
a second output terminal coupled to the first regulator, wherein the second output terminal is coupled to the ground potential in the first configuration, wherein the second output terminal is coupled to the ground potential in the second configuration; and
a third output terminal coupled to the first regulator, wherein the third output terminal is coupled to a node associated with the first supply voltage in the first configuration, the node being coupled to a second side of the external inductor and an external capacitor being coupled between the node and the ground potential, and wherein the third output terminal is coupled to the ground potential in the second configuration.

6. The IC of claim 1, wherein the first set of terminals comprises:
a first output terminal coupled to the second regulator, wherein the first output terminal is coupled to a first side of an external inductor in the second configuration, wherein the first output terminal is coupled to ground in the first configuration;
a second output terminal coupled to the second regulator, wherein the second output terminal is coupled to the ground potential in the second configuration, wherein the second output terminal is the ground potential to ground in the first configuration; and
a third output terminal coupled to the second regulator, wherein the third output terminal is coupled to a node associated with the first supply voltage in the second configuration, the node being coupled to a second side of the external inductor, and wherein the third output terminal is coupled to the ground potential in the first configuration.

7. The integrated circuit of claim 1, wherein the first regulator is a first buck converter that operates at a first voltage level and the second regulator is a second buck converter that operates at a second voltage level less than the first voltage level.

8. The integrated circuit of claim 7, wherein the first voltage level is in a voltage range of approximately 2.7 volts to approximately 5.5 volts and the second voltage level is in a voltage range of approximately 1.8 volts to approximately 3.3 volts.

9. The integrated circuit of claim 1, further comprising:
a state machine coupled to an input of the first regulator and an input of the second regulator, the state machine to output a set of one or more mode control bits to the first regulator and the second regulator, the one or more control bits to configure the first regulator in the first configuration and configure the second regulator in the second configuration; and
a multiplexer coupled to an input of the state machine, an output of the first regulator, and an output of the second regulator, wherein the multiplexer is to receive a first feedback signal from the first regulator in the first configuration and a second feedback signal from the second regulator in the second configuration, wherein the multiplexer is to provide the first feedback signal or the second feedback signal to the state machine.

10. The integrated circuit of claim 9, further comprising:
a brown-out-detection (BOD) circuit coupled to the first terminal, the BOD circuit to output a fault signal.

11. A system comprising:
a plurality of power supplies; and
a power management unit (PMU) comprising:
a first terminal coupled to a first power supply;
a second terminal coupled to a second power supply;
a first regulator coupled to the first terminal and the second terminal;
a second regulator coupled to the second terminal, wherein the first regulator is to output a first supply voltage in a first configuration of the PMU, and wherein the second regulator is to output a second supply voltage in a second configuration of the PMU;
a first set of terminals coupled to the first regulator, wherein the first set of terminals is grounded in a second configuration; and
a second set of terminals coupled to the second regulator, wherein the second set of terminals and the first terminal are grounded in a first configuration.

12. The system of claim 11, further comprising a microcontroller unit (MCU) coupled to the PMU.

13. The system of claim 11, wherein, in the first configuration, the plurality power supplies comprises an unregulated power supply coupled to the first terminal.

14. The system of claim 11, wherein, in the first configuration, the plurality power supplies comprises a regulated power supply coupled to the second terminal, wherein the unregulated power supply comprises a battery.

15. The system of claim 14, wherein the unregulated power supply is in a voltage range between approximately 2.7 volts and approximately 5.5 volts, and wherein the regulated power supply is in a voltage range between approximately 1.8 volts and approximately 3.3 volts, and wherein the first supply voltage is approximately 5 volts.

16. The system of claim 11, wherein, in the second configuration, the one or more power supplies comprises a regulated power supply.

17. The system of claim 16, wherein the regulated power supply is to operate in a range between approximately approximately 1.8 volts and 3.3 volts, and wherein the second supply voltage is approximately 1.8 volts.

18. A power management subsystem integrated circuit (IC) coupled to one or more power supplies, the power management subsystem IC comprising:
a first switching regulator coupled to a first set of terminals;
a second switching regulator coupled to a second set of terminals, wherein the second set of terminals is grounded when the first switching regulator is operating, and wherein the first set of terminals is grounded when the second switching regulator is operating.

19. The power management subsystem IC of claim 18, wherein the second supply voltage is in a voltage range between approximately 1.8 volts and approximately 3.3 volts, and wherein the first supply voltage is higher than the second supply voltage.

\* \* \* \* \*